United States Patent
Brown-Shaklee et al.

(10) Patent No.: US 9,963,394 B2
(45) Date of Patent: May 8, 2018

(54) METHOD FOR PRODUCING DENSE LITHIUM LANTHANUM TANTALATE LITHIUM-ION CONDUCTING CERAMICS

(71) Applicant: Sandia Corporation, Albuquerque, NM (US)

(72) Inventors: Harlan James Brown-Shaklee, Albuquerque, NM (US); Jon Ihlefeld, Albuquerque, NM (US); Erik David Spoerke, Albuquerque, NM (US); Mia Angelica Blea-Kirby, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 366 days.

(21) Appl. No.: 15/010,875

(22) Filed: Jan. 29, 2016

(65) Prior Publication Data

US 2016/0221880 A1    Aug. 4, 2016

Related U.S. Application Data

(60) Provisional application No. 62/110,834, filed on Feb. 2, 2015.

(51) Int. Cl.
   *C04B 35/495* (2006.01)
   *C04B 35/64* (2006.01)
   *C04B 35/626* (2006.01)

(52) U.S. Cl.
   CPC ........ *C04B 35/495* (2013.01); *C04B 35/6261* (2013.01); *C04B 35/62645* (2013.01); *C04B 35/64* (2013.01); *C04B 2235/3203* (2013.01); *C04B 2235/3227* (2013.01); *C04B 2235/443* (2013.01); *C04B 2235/449* (2013.01); *C04B 2235/5436* (2013.01); *C04B 2235/6567* (2013.01); *C04B 2235/668* (2013.01);
   (Continued)

(58) Field of Classification Search
   CPC ... C04B 35/495; C04B 35/6261; C04B 35/64; C04B 35/62645; C04B 2235/80; C04B 2235/81; C04B 2235/3227; C04B 2235/443; C04B 2235/77; C04B 2235/6567; C04B 2235/5436; C04B 2235/449; C04B 2235/3203; C04B 2235/668
   See application file for complete search history.

(56) References Cited

U.S. PATENT DOCUMENTS

| 4,007,020 A | * | 2/1977 | Church | B24D 3/18 51/295 |
| 4,206,133 A | * | 6/1980 | Joyce, III | C07F 9/02 252/602 |

(Continued)

OTHER PUBLICATIONS

Hayashi, K. et al., "New Phases in La2O3—Li2O—Ta2O5 System", Mat. Res. Bull., vol. 21 (1986), pp. 289-293.

(Continued)

*Primary Examiner* — Nahida Sultana
(74) *Attorney, Agent, or Firm* — Kevin W. Bieg

(57) ABSTRACT

A method to produce high density, uniform lithium lanthanum tantalate lithium-ion conducting ceramics uses small particles that are sintered in a pressureless crucible that limits loss of $Li_2O$.

11 Claims, 5 Drawing Sheets

(52) U.S. Cl.
CPC ...... *C04B 2235/77* (2013.01); *C04B 2235/80* (2013.01); *C04B 2235/81* (2013.01)

(56) References Cited

U.S. PATENT DOCUMENTS

| | | | | |
|---|---|---|---|---|
| 6,126,743 | A * | 10/2000 | Saegusa | C03C 10/00 |
| | | | | 117/68 |
| 2009/0317664 | A1* | 12/2009 | Niessen | H01M 6/40 |
| | | | | 429/7 |
| 2010/0233548 | A1* | 9/2010 | Pijnenburg | H01M 4/13 |
| | | | | 429/322 |
| 2012/0156379 | A1* | 6/2012 | Sepeur | B01J 21/063 |
| | | | | 427/372.2 |
| 2015/0101317 | A1* | 4/2015 | Phillips | F01N 11/002 |
| | | | | 60/299 |
| 2015/0349376 | A1* | 12/2015 | Shin | H01M 10/0562 |
| | | | | 429/322 |

OTHER PUBLICATIONS

Lamoreaux, R.H. et al., "High Temperature Vaporization Behavior of Oxides. I. Alkali Metal Binary Oxides", J. Phys. Chem. Ref. Data, vol. 13, No. 1 (1984), pp. 151-173.

* cited by examiner

METHOD FOR PRODUCING DENSE LITHIUM LANTHANUM TANTALATE LITHIUM-ION CONDUCTING CERAMICS

CROSS-REFERENCE TO RELATED APPLICATION

This application claims the benefit of U.S. Provisional Application No. 62/110,834, filed Feb. 2, 2015, which is incorporated herein by reference.

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to lithium ion conducting ceramics and, in particular, to an improved method for producing dense lithium lanthanum tantalite lithium ion conducting ceramics.

BACKGROUND OF THE INVENTION

Lithium lanthanum tantalate (LLTO) ceramics exhibit broad technological significance as lithium-ion conductors, with particular relevance for applications such as lithium-ion battery systems. More recently, LLTO ceramics have been identified as useful materials for nuclear waste separation and fuel reprocessing due to a difference in Li and Cs diffusivity. See U.S. Provisional application Ser. No. 14/660, 696, filed Mar. 17, 2015, which is incorporated herein by reference. For optimal ion conductivity and robust structural and chemical stability, however, lithium-ion conducting ceramics must be highly dense with no interconnected porosity. High density ceramics can also exhibit higher total conductivity due to their apparent lack of volumetric pore dilution.

Pressureless sintering is an important processing requirement for production of low cost ion conductors. Pressure assisted densification (e.g., hot pressing), although often an effective means of achieving high density ceramics, is generally considered a batch-type process that requires significant capital investment and recurring tooling costs. Moreover, it can be difficult or impossible to create contoured ceramic geometries (e.g., tubes) using hot pressing. As a result, processing methods that enable pressureless sintering are often favored over hot isostatic pressing or hot pressing.

LLTO is an alkali containing ceramic, and alkali ceramics are particularly difficult to sinter to full density for several reasons. The $Li_2O$—$La_2O_3$—$Ta_2O_5$ phase diagram is very complex, making LLTO processing difficult. See K. Hayashi et al., *Mat. Res. Bull.* 21(3), (1986). Further, alkali oxides ($R_2O$, e.g., $Li_2O$) exhibit significant vapor pressures at common sintering temperatures, leading to significant reagent loss to volatility. See R. H. Lamoreaux and D. L. Hildenbrand, *J. Phys. Chem. Ref. Data* 13(1), (1984). Common sintering temperatures for alkali-based ceramics are frequently above 1000° C. which exacerbates the effects of $R_2O$ volatility. Alkali-based ceramic particles are also prone to coarsening due in part to $R_2O$ volatility as well as the propensity to form liquid phases during calcination. If the alkali is allowed to escape from the atmosphere surrounding the ceramic, a typical microstructure will exhibit a porous outer rim and semi-dense interior. Therefore, the composition of the sintered ceramic depends on location within the specimen and will be alkali deficient near the outermost regions of the sintered ceramic. Finally, $Li_2O(g)$ is reactive with most oxide kiln hardware in which many sintering studies are conducted.

SUMMARY OF THE INVENTION

The present invention is directed to a new method to produce $Li_5La_3Ta_2O_{12}$ (LLTO) lithium-ion conducting ceramics. To achieve high density, uniform LLTO ceramics with pressureless sintering, powders with small particle sizes are first produced and then sintered in an environment that limits loss of $R_2O$. Using the hybrid solid-state synthesis method, near full density and phase pure LLTO ceramics can be produced.

As an example of the present invention, LLTO powders were first synthesized from tantalum oxide ($Ta_2O_5$), lanthanum acetate (La(OAc)), and lithium nitrate ($LiNO_3$). $LiNO_3$ was first dissolved in ethanol while La(OAc) was dissolved in propionic acid under mild heating. A ceramic suspension of $Ta_2O_5$ in ethanol was then blended with the $LiNO_3$ and La(OAc) solutions and reduced in volume by evaporation of the solvents. The resulting precursor was combusted at ~500° C. to remove the acetate ion and remaining propionic acid and then calcined above 800° C. to remove carbonates. The calcination step resulted in a mixed phase powder that can then be used to reactively sinter LLTO ceramics to >95% of the theoretical density (6.334 g/cm³). These ceramics exhibit room temperature conductivities of $2\times10^{-5}$ S/cm which is about 10× higher than previously reported values.

BRIEF DESCRIPTION OF THE DRAWINGS

The detailed description will refer to the following drawings, wherein like elements are referred to by like numbers.

DETAILED DESCRIPTION OF THE INVENTION

Figure 1:
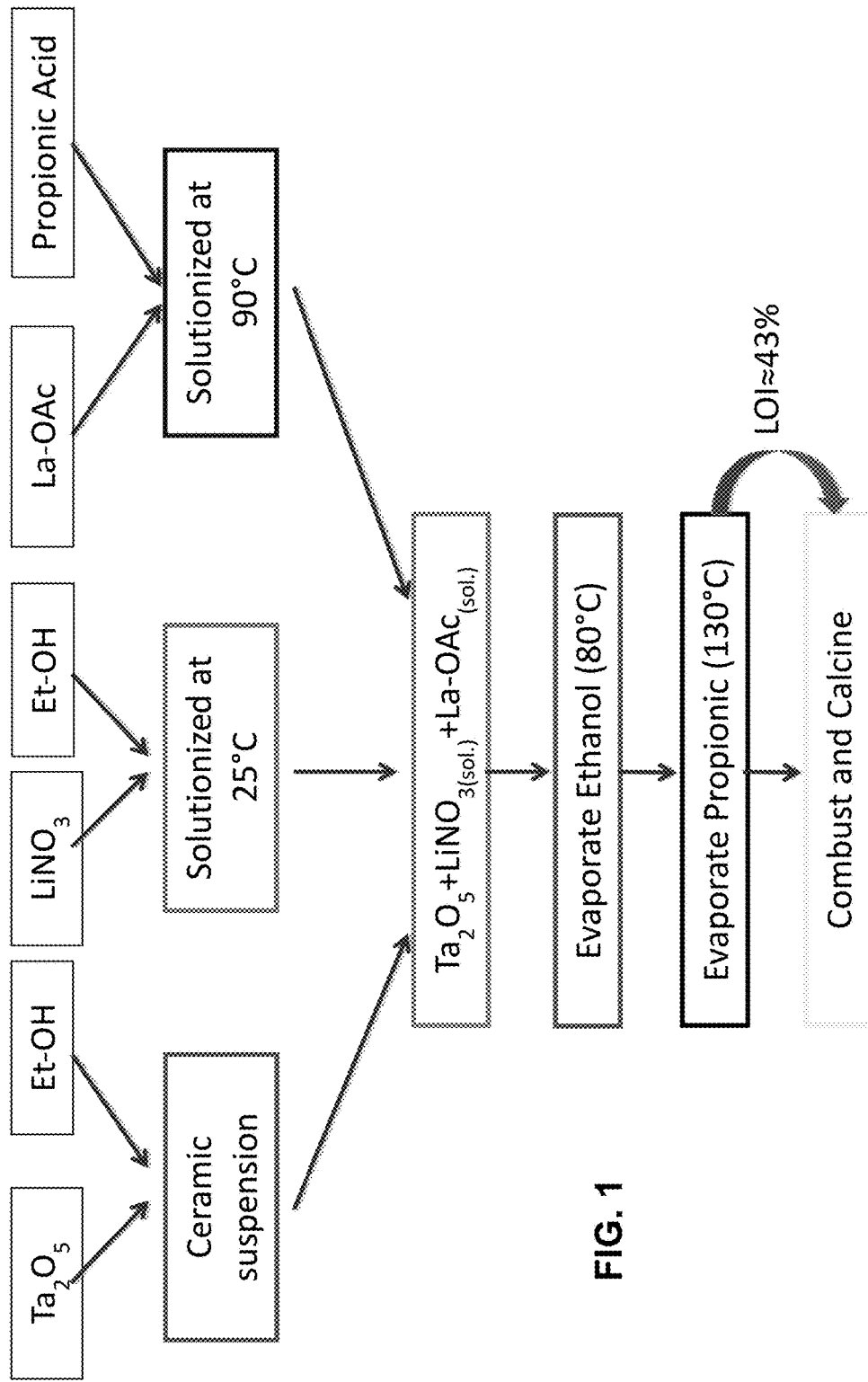
FIG. 1 is an illustration of a synthesis method for reducing the particle size of ceramic powders to enable the production of dense LLTO ceramics.

The invention is directed to a method to produce near full density LLTO ceramics without phase decomposition by pressureless sintering. As shown in FIG. 1, LLTO powders were synthesized from $LiNO_3$, $La(CH_3CO_2)_3$-$xH_2O$(La (OAc)), and $Ta_2O_5$ precursors. As an example of the invention, $LiNO_3$ and La(OAc) were dissolved in alcohol and propionic acid, respectively, to produce ~0.4M $LiNO_3$ and 1.9M La(OAc) solutions. These solutions were then blended with an alcohol-$Ta_2O_5$ ceramic suspension in stoichiometric quantities to achieve the target cation ratio of 5Li:3La:2Ta. After the alcohol and propionic were removed via evaporation, the mixture was then heated to achieve slow combustion within a furnace thus removing organics to produce a homogenous mixture of carbonates and oxides. This mixture was then heated in excess of 800° C. to remove carbonates of lanthanum and form the mixed oxides that will eventually form LLTO.

Figure 2:
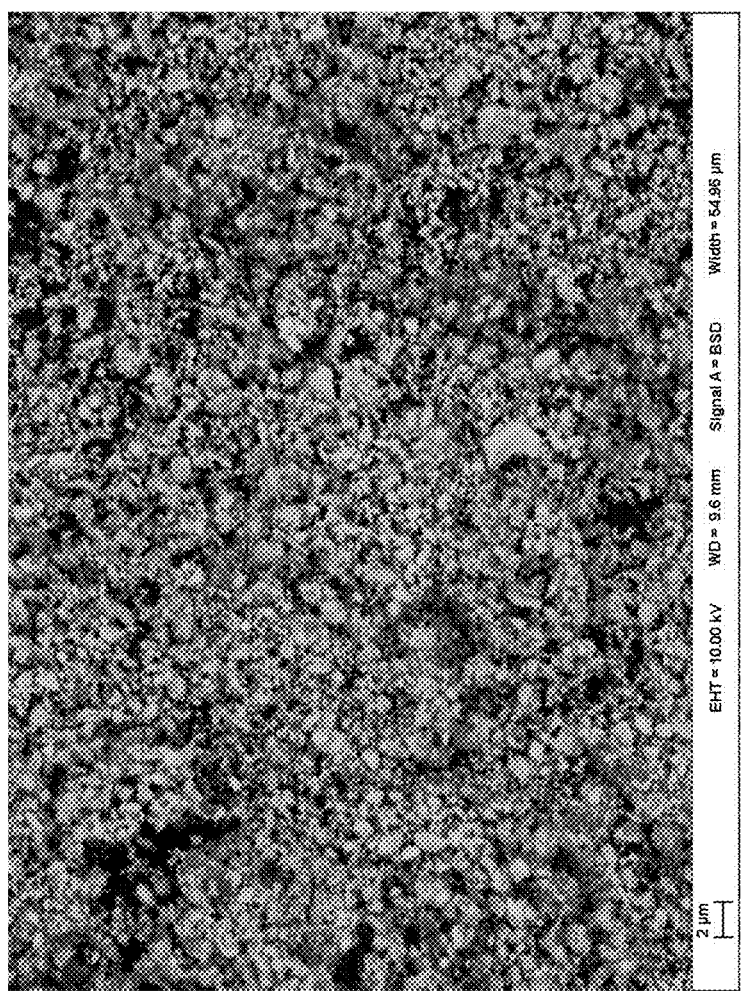
FIG. 2 is a scanning electron micrograph of a calcined powder.

After calcination, the particle size of the synthesized and calcined powder is less than 2 μm, as shown in FIG. 2. The particle size can then be further reduced by low energy milling (e.g., ball milling). Prepared powder compacts or green ceramic bodies can then be placed in a closed crucible whose composition is appropriate to resist $R_2O$ diffusion and reaction with $R_2O$. The powder compacts can then be sintered in this crucible at 1300° C. for 12 hours. With this method, the sealed crucible can produce dense (98.4% relative density) ceramic specimens with only trace minor phases.

Figure 3:
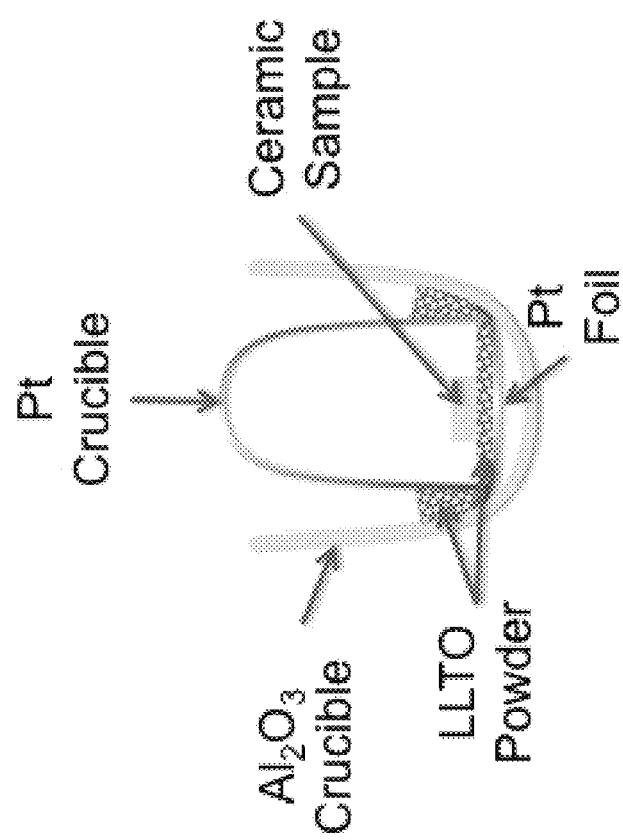
FIG. 3 is a schematic illustration of a $Li_2O$ vapor containment crucible for LLTO sintering.

A diagram of an exemplary $R_2O$ vapor containment crucible is shown in FIG. 3. This system contains a fully closed (not hermetically sealed) Pt crucible with Pt foil. Other crucibles that are non-reactive with LLTO ceramics and can be used include Ni, Pt, Pd, Ir, other transition group metals, and alloys thereof. LLTO powders around the exterior of the Pt—Pt interfaces prevent $Li_2O$ from leaving the crucible, i.e., $Li_2O$ permeability in Pt is sufficiently low to prevent diffusion out of the crucible. $Al_2O_3$ crucibles alone are not sufficient to prevent $Li_2O$ volatilization because $Li_2O$ vapor can readily react with $Al_2O_3$ to form $Li_2O$—$Al_2O_3$ and $Li_2O$-$5Al_2O_3$ intermediate compounds. These intermediate compounds consume volatile $Li_2O$ and the LLTO stoichiometry shifts to Li-deficient compounds. Conversely, oxidation of Pt crucible materials can be controlled by appropriate control of oxygen partial pressure. Any volatile alkali oxides are sufficiently maintained within the closed Pt crucible to maintain stoichiometry. If the volatile oxides are maintained within the closed and non-reactive crucible, the composition and density will be uniform throughout the ceramic body.

Figure 4:
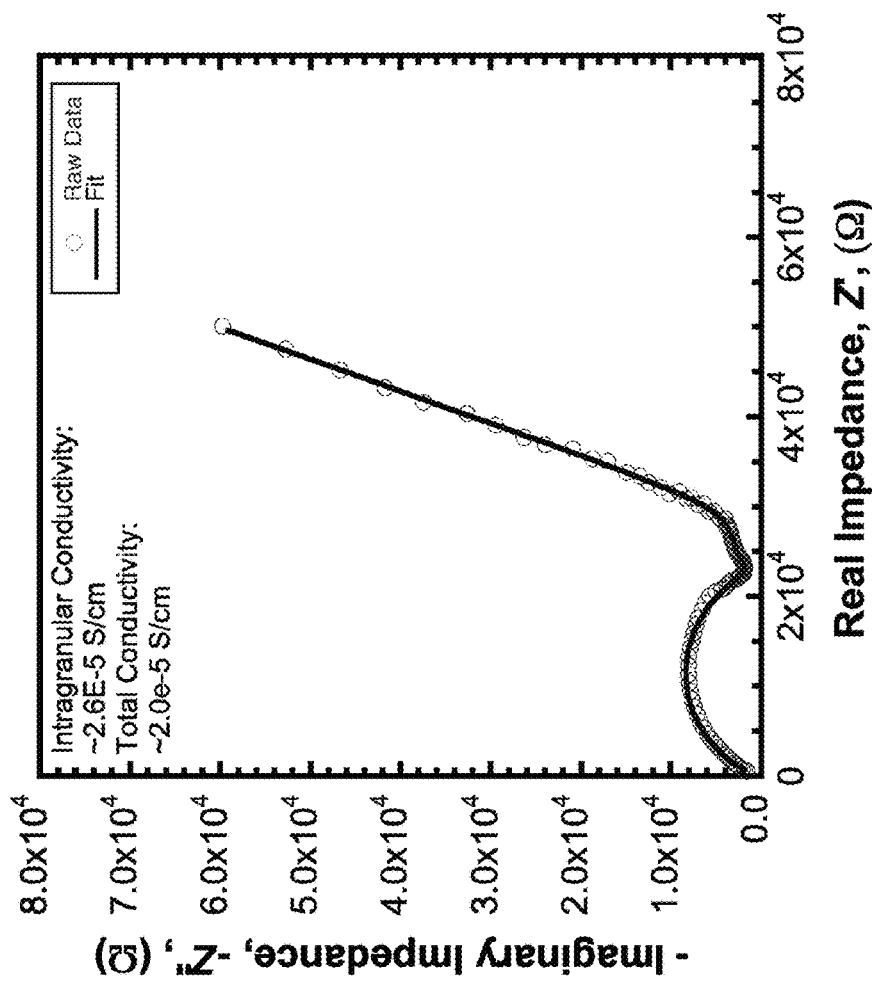
FIG. 4 is a graph of the room temperature impedance behavior of a sintered LLTO ceramic.

FIG. 4 is a plot of the impedance of the sintered ceramic measured at room temperature. The ionic conductivity values (~$2 \times 10^{-5}$ S/cm) are significantly higher than any LLTO reported in the literature (by ~10×) and are comparable to Ba-substituted compounds and other fast ion conductors. The conductivity improvement is likely due to the improved density.

Figure 5B:
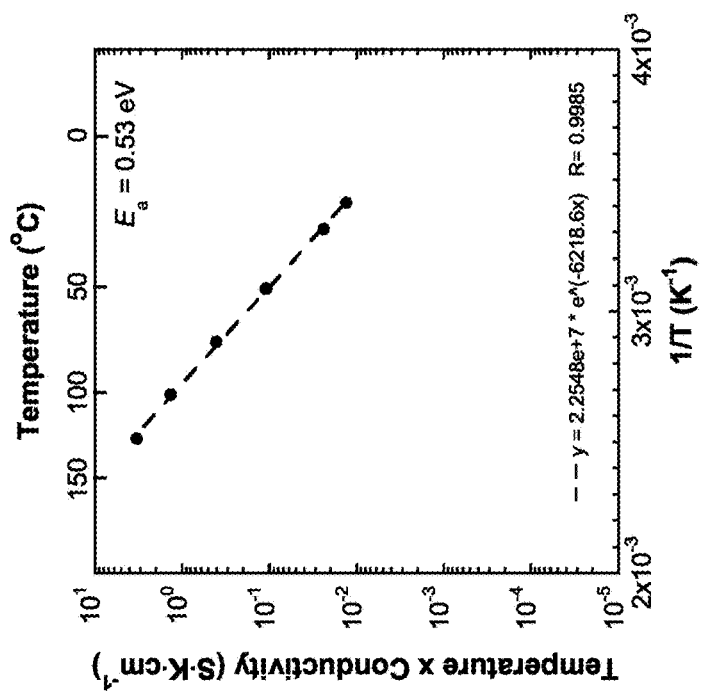
FIGS. 5(a) and 5(b) are graphs of the temperature-dependent ionic conductivity of a sintered LLTO ceramic.
Figure 5A:
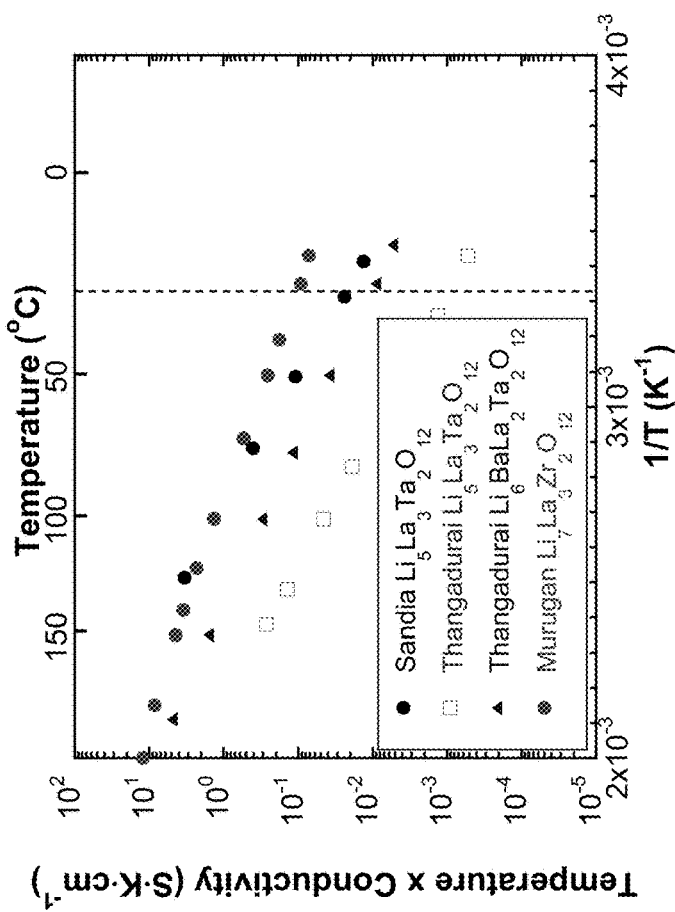

FIGS. 5(a) and 5(b) are graphs of the ionic conductivity as a function of temperature. As shown in FIG. 5(a), the ionic conductivity of the ceramic of the present invention (labeled "Sandia $Li_5La_3Ta_2O_{12}$") surpasses literature reports of LLTO (labeled "Thangadurai $Li_5La_3Ta_2O_{12}$) and LBLTO (labeled "Thangadurai $Li_6BaLa_2Ta_2O_{12}$) and exceeds LLZO (labeled "Murugan $Li_7La_3Zr_2O_{12}$) at 125° C. As shown in FIG. 5(b), the activation energy for Li-conduction is 0.53 eV. This activation energy is slightly higher than that determined for LLZO ($E_a$=0.46 eV) and compares well with literature LLTO values ($E_a$=0.56 eV).

The present invention has been described as a method for producing dense lithium lanthanum tantalate lithium-ion conducting ceramics. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for producing a lithium lanthanum tantalate ceramic, comprising:
    dissolving lithium nitrate in an alcohol solvent;
    dissolving lanthanum acetate in an acid solvent;
    suspending tantalum oxide in an alcohol;
    blending the lithium nitrate solution, the lanthanum acetate solution, and the tantalum oxide suspension and evaporating the solvents to provide a stoichiometric mixture;
    combusting the stoichiometric mixture at a sufficiently high temperature to remove organics, thereby providing an inorganic mixture;
    calcining the inorganic mixture at a sufficiently high temperature to remove carbonates, thereby providing a mixed oxide powder; and
    sintering the mixed oxide powder in a closed and non-reactive crucible at a sufficiently high temperature and pressure to provide a dense lithium lanthanum tantalate ceramic.

2. The method of claim 1, wherein the alcohol solvent for dissolving lithium nitrate comprises ethanol.

3. The method of claim 1, wherein the acid solvent for dissolving lanthanum acetate comprises propionic acid.

4. The method of claim 1, wherein the alcohol for suspending tantalum oxide comprises ethanol.

5. The method of claim 1, wherein the sufficiently high temperature for combusting is greater than 500° C.

6. The method of claim 1, wherein the sufficiently high temperature for calcining is greater than 800° C.

7. The method of claim 1, wherein the sufficiently high temperature for sintering is greater than 1000° C.

8. The method of claim 1, wherein the sufficiently high pressure for sintering is ambient pressure.

9. The method of claim 1, wherein the closed and non-reactive crucible comprises a platinum crucible.

10. The method of claim 1, wherein the closed and non-reactive crucible comprises a transition metal crucible.

11. The method of claim 10, wherein the transition metal comprises nickel, platinum, palladium, iridium, or alloys thereof.

* * * * *